United States Patent [19]

Rütschle et al.

[11] Patent Number: 5,662,567
[45] Date of Patent: Sep. 2, 1997

[54] MACHINE TOOL

[75] Inventors: Eugen Rütschle, Mühlheim; Rudolf Haninger, Seitingen; Hans-Henning Winkler, Tuttlingen, all of Germany

[73] Assignee: Chiron-Werke GmbH & Co. KG, Germany

[21] Appl. No.: 426,153

[22] Filed: Apr. 21, 1995

[30] Foreign Application Priority Data

Apr. 30, 1994 [DE] Germany .................. 44 15 306.6

[51] Int. Cl.$^6$ .................................................. B23Q 3/157
[52] U.S. Cl. ........................ 483/10; 483/34; 408/239 R
[58] Field of Search ................................. 483/10, 12, 34, 483/35; 409/231; 408/239 R

[56] References Cited

U.S. PATENT DOCUMENTS

| | | | |
|---|---|---|---|
| 3,851,562 | 12/1974 | Tomita et al. | 483/34 |
| 3,953,039 | 4/1976 | Hauge et al. | 483/34 |
| 4,406,721 | 9/1983 | Tomita et al. | 483/35 |
| 5,263,918 | 11/1993 | Ruetschle et al. | 483/10 |

FOREIGN PATENT DOCUMENTS 62-193712  8/1987  Japan ......................... 483/34

Primary Examiner—Daniel W. Howell
Assistant Examiner—Kenneth J. Hansen
Attorney, Agent, or Firm—Pretty, Schroeder & Poplawski

[57] ABSTRACT

A machine tool comprises a headstock (12) having a rotatable spindle (16) and having motor means for rotatably driving said spindle (16). At least one gripper (26) is provided for gripping a tool holder (18) and for transferring same from a first, uncoupled position outside said spindle (16) into a second, ready-to-couple position within said spindle (16). Coupling means (35) are provided at said headstock (12) for coupling said tool holder (18) in said second, ready-to-couple position with said spindle (16) such that said tool holder (18) assumes one of at least two coupled conditions, whereby in such coupled condition said tool holder (18) is locked on said spindle (16) for rotation therewith. Said at least two coupled conditions differ from one another with respect to a relative angular alignment between said tool holder (18) and said spindle (16). Control means are provided for controlling said motor means and having sensor means (48) for detecting said tool holder (18) to be in one of said coupled conditions and for differentiating between said at least two coupled conditions.

11 Claims, 4 Drawing Sheets

MACHINE TOOL

BACKGROUND OF THE INVENTION

The present invention relates to a machine tool having a spindle rotating in a headstock and, further, comprising a gripper for transferring a tool holder from an uncoupled position into a ready-to-couple position within the spindle. A coupling mechanism is provided for further transferring the tool holder from the ready-to-couple position to a coupled position within the spindle in which the tool holder can be rigidly connected to the spindle for rotation therewith. In order to control the transferring steps, a sensor is provided for detecting whether the tool holder is in its coupled position.

Such a machine tool is known from U.S. Pat. No. 5,263, 918.

In the known machine tool a tool holder with clamped tool is inserted into the spindle by means of a gripper arm. The tool holder is rotatably mounted in the gripper arm under friction.

In order to make a torsionally rigid connection between the tool holder and spindle the surface of the spindle facing the tool holder is provided with a spring-borne catch. The opposite face of the tool holder, which is already aligned coaxial to the spindle, is provided with two grooves which lie on two different radii so that the catch can only engage in one of the grooves. When the tool holder is inserted into the rotating spindle that catch does not usually engage exactly in one groove but makes contact with the otherwise smooth face of the tool holder so that the catch is pressed back into the spindle against the force of the spring. A relative movement between the tool holder and catch now occurs through the pulling effect of the catch and on account of the friction of the tool holder in the gripper so that this slides along the face of the tool holder and finally "locates" the corresponding groove.

The catch is assigned a signal rod which is borne in such a way that it can slide along the spindle and which follows the relative movements of the catch to the spindle. Moreover, a concentric signal ring is provided on the spindle which follows the movements of the signal rod so that this is in an initial axial position when the tool holder is in a couplable position and assumes an second axial position when the tool holder has been coupled. Furthermore, a fixed transducer is provided which interacts with the signal ring in such a way that it can differentiate between the two different axial positions.

The transducer consequently initially signals that the catch is located in its lower axial position during insertion of the tool holder in the spindle, which means that there is no tool holder in the spindle. During insertion of the tool holder in the spindle the signal ring is pushed upwards so that the transducer signals that a tool holder is in a couplable position. When the catch has now engaged in "its" groove" the signal ring falls back into its lower position, which is detected by the transducer. This sequence of signals from the transducer is processed by a sequence controller which runs the spindle up to operating speed immediately after the coupled position has been assumed.

The tool is thus coupled very quickly through a monitoring of the catch.

On account of the fact that only one of the two grooves lies on the correct diameter, so that the catch can only engage in this groove, the tool is always aligned "correctly" to the spindle. This orientation is important, e.g. during work with lathe tools, which must be correctly oriented when retracted from a bore hole to prevent scoring.

One disadvantage of the known machine tool is that the tool change time depends largely on the random position at which the gripper inserts the tool holder into the spindle. For example, the catch can engage in the correct groove after a veryshort relative rotation between the spindle and tool holder, though this relative movement can also be up to almost 360°. The relative speed between the tool holder and spindle can be low, particularly in the case of a tool holder which rotates almost unbraked in the gripper, so that the tool change can take a long time.

SUMMARY OF THE INVENTION

On these premises the object of the present invention is to improve a machine tool of the type described at the outset so that the tool change time can be reduced without an excessive increase to the constructional requirements.

In accordance with the invention this object is achieved for the machine tool mentioned at the outset inasmuch as at least two coupled states are provided which differ from one another with respect to a relative angular alignment between the tool holder and spindle, and the sensor device is designed in such a way that the coupled states cab be differentiated from one another.

The object on which the invention is based is thus completely solved. Two coupled states means namely that, e.g., two grooves are provided which are diametrically opposed to one another but which are on the same diameter so that the catch can engage in both grooves. The maximum necessary relative movement between the spindle and tool holder is thus reduced from 360° to 180°, so that it is halved with two coupled states. However, it can also be designed in such a way that the catch can engage in two grooves which are on different radii by providing the catch with a reduced contour, for example. Standardised tool holders can then be used.

However, the sequence controller of the machine tool does not now know how the tool holder is orientated to the spindle, which is disadvantageous during the work mentioned above, e.g. with lathe tools.

The inventor, however, has realised that he can improve the known sensor devices so that these can differentiate between the two coupled states. In this way the sequence controller is provided with information on the orientation between the tool holder and thus the tool and spindle.

With two coupled states this part of the tool change time is thus halved, with three coupled states it is reduced to one third, etc.

It is hereby preferable if the coupling facility comprises a catch which is borne on the spindle and which can be moved between at least three positions relative to the spindle and which engages in one of the recesses provided in the tool holder when this is coupled, and if the sensor recognises the relative position of the catch to the spindle whereby the catch engages in a different manner in the different recesses, preferably to different depths.

This measure is particularly advantageous since the monitoring of and differentiation between the coupled states is very simple. On the one hand the sensor device recognises when the catch rests upon, e.g. the face or lateral area of the tool holder and is thus inserted into the spindle. The sensor can thus signal that the tool holder is in the couplable position, this being recognised by the relative position of the catch. When the catch now slides along the face and engages in a groove, the sensor also recognises this engagement, whereby the depth of engagement preferably provides information as to which coupled state, in other words in which relative orientation to the spindle the tool holder is in, and thus the tool therein. The two recesses can also rotate the catch in different manners, for example, whereby the sensor device reacts to the direction of rotation.

It is furthermore preferable if the sensor device comprises at least one signal transmitter which rotates with the spindle.

This as such known measure is particularly advantageous since the signal transmitter is always "on the spot", as it were, and does not have to wait for part of the spindle's rotation, in an unfavourable case, until the sensor device recognises the respective state.

It is also preferable if the sensor device displays a recording device assigned to the signal transmitter which is arranged in a manner that it cannot rotate relative to the headstock.

This as such known measure is advantageous inasmuch as the recording device can be arranged in a constructionally simple manner. An optical receiver, or example, can be provided as a recording device which detects a beam of light emitted from or reflected by the signal transmitter.

It is furthermore preferable if the recording device reacts to the signal transmitter in every relative angular position between the spindle and the headstock.

This measure is particularly advantageous since the coupling is signalled to the recording device as soon as the coupling process has been completed.

It is hereby particularly preferable if the signal transmitter displays at least one signal rod borne on the spindle in such a way that it can be moved longitudinally, which is assigned, to the catch and which follows the relative movements of the catch to the spindle.

The advantage of this as such known measure is that no signal transit time passes between the engagement of the catch in the groove and the message from the signal transmitter, the catch itself forms part of the signal transmitter, in a manner of speaking.

On the whole it is preferable if the recording device comprises at least two signal transmitters which record the different engagement of the catch in the recesses.

The advantage of this is that three different states of the catch can be recorded with two signal transmitters in a constructionally simple manner. For example, if the two signal transmitters are arranged one above the other the lower signal transmitter shows that the catch has engaged in the deeper groove whereas the upper signal transmitter shows that the catch has engaged in the shallower groove. If the signal transmitters are arranged alongside one another, one can record a rotation in the first direction and the other in the second direction. However, different degrees of rotation in one direction can also be recorded.

On the whole, it is preferable if the sensor means comprises a ring being arranged concentrically to said spindle and being journelled axially on said spindle, said ring coacting with said coupling means such that when said tool holder is in said second, ready-to-couple position said ring is in a first axial position and continuously coacts with at least two fixed transducers, when said tool holder is in a first coupled condition said ring is in a second axial position and continuously coacts with said transducer, and when said tool holder is in a second coupled condition said ring is in a third axial position and coacts with said transducers.

This measure not only leads to the advantages already discussed above, namely continuous signal transmission between the signal transmitter and recording device, but also permits a very simple inductive recording of measured values, such as is known from U.S. Pat. No. 5,263,918 mentioned at the outset, alongside the optical method already described above.

Further advantages arise from the description and the enclosed drawing.

It is understood that the features mentioned above and those to be explained in the following are applicable not only for the specified combinations but also in other combinations or on their own without going beyond the scope of the present invention.

BRIEF DESCRIPTION OF THE DRAWINGS

Preferred embodiments of the invention are shown in the drawing and will be described in more detail in the following explanation. The illustrations show the following.

DETAILED DESCRIPTION OF THE PREFERRED EMBODIMENTS

Figure 1:
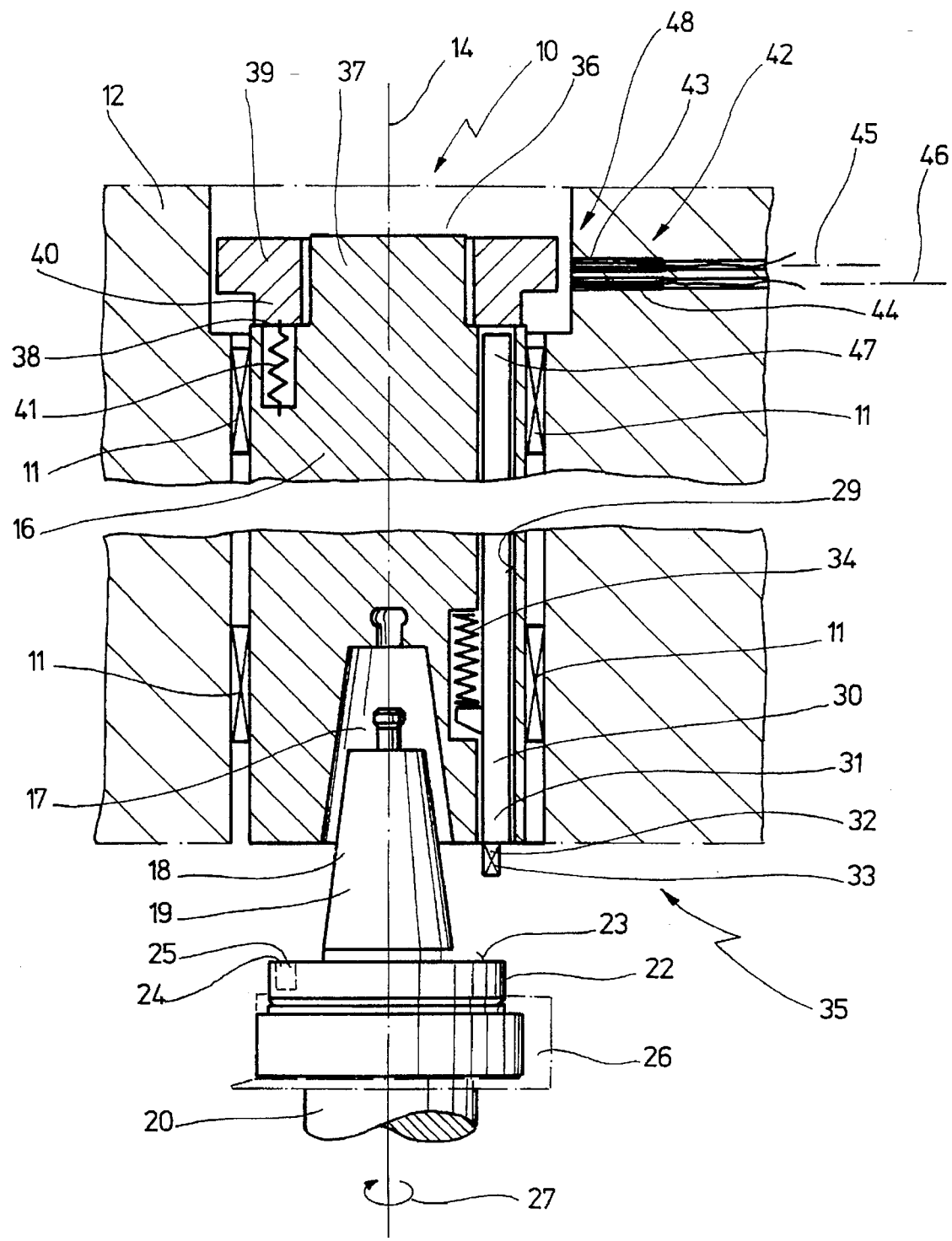
FIG. 1 a schematic sectional diagram along the spindle axis of a machine tool in accordance with the invention, in section and partially, whereby the tool holder is in an uncoupled position.

FIG. 1 shows a schematic sectional diagram and a section of a machine tool 10 in a first preferred embodiment of the invention. The machine tool 10 comprises a spindle 16 mounted for rotation around its spindle axis 14 in a headstock 12 by means of bearings 11. The spindle 16 is connected in a known manner to a drive or motor unit not shown in FIG. 1. A sequence controller, shown at 13 in FIG. 5, is provided for the drive unit via which the spindle can be operated at various speeds.

The spindle has a recess 17 or receptacle for a tool holder 18 on its lower end, which in the design example shown here comprises a steep-angle taper 19.

The tool holder 18 has a cylindrical shaft 20 on the end opposite the taper 19 in which a tool, not shown in FIG. 1, is clamped. Approximately in the middle between the taper 19 and the cylindrical shaft 20, the tool holder 18 has a radial, protruding annular collar 22 which bears an annular face 23 which faces the quick-release taper 19. A groove, indicated by 24, is provided in the face 23 as a recess 25 whose function will be described in more detail later. The tool holder 18 displays two grooves 24, 24' in the design variant shown here (cf. FIG. 2) which are diametrically opposed to one another and display different depths.

The tool holder 18 is held in an as such known manner by a gripper, indicated by 26, which is part of a gripper arm, similarly not shown. The tool holder can, for example be removed from a tool magazine and inserted into the recess 17 of the spindle 16 by the gripper arm.

In the position of the tool holder 18 shown in FIG. 1 this is axially aligned to the spindle axis 14, but is not yet in a position in which it can be coupled with the spindle 16. However, the spindle itself 16 is already running at a slow coupling speed, as indicated at 27.

The spindle 16 displays a bore hole 29 which runs parallel to the spindle axis 14 and which penetrates the spindle 16 in a longitudinal direction and bears a signal rod 30 which can be moved longitudinally. The signal rod 30 serves as a signal transmitter 31, whose function will be described in more detail later, and has a catch 32 in the form of a key 33 on its lower end which should engage with one of the grooves 24, 24' and thus lock the tool holder with the spindle so that this cannot rotate with respect to the spindle. The signal rod 30 is biased in the position shown in FIG. 1 by a compression spring, schematically shown by 34, whereby in this position the key 33 protrudes down over the spindle 16. The catch 32 and the spring 34 correspond to normal coupling facilities 35 which serve to couple the tool holder 18 to the spindle 16.

The spindle 16 bears a cylindrical 137 extension concentric to the spindle axis 14 with a smaller radial diameter than the spindle 16 itself on its upper end 36 opposite the recess 17. The transition between the cylindrical extension 37 and the spindle 16 is formed by a collar or shoulder 38.

A stepped ring 39 is located on the cylindrical extension 37 which is concentric to the spindle 16 and in the position of the tool holder 18 shown in FIG. 1 rests with its lower annular flange 40 on the collar 38. It can be seen that the annular flange 40 has a smaller outside diameter than the signal ring 39. The signal ring 39 and the annular flange 40, which are made as one piece, are made of brass in the design variant shown here.

Springs 41 are provided distributed around the circumference of the spindle 16, one of which is shown in FIG. 1. One end of the tension spring 41 is connected to the spindle 16 and the other to the annular flange 40 so that they pull the signal ring 39 onto the collar 38.

The signal ring 39 is assigned a recording device 42 which is fixed in the headstock 12. In the design variant shown here the recording device 42 comprises two inductive proximity switches 43, 44.

As can be seen in FIG. 1, the inductive proximity switches 43, 44 are fixed permanently to the headstock 12 and are located on elevations indicated by 45 and 46, chosen in a such a way that the signal ring 39 which rests on the collar 38 optimally dampens the field of the inductive proximity switches 43, 44. Although the spindle 16 rotates at coupling speed 27 the signal ring 39 hereby ensures a permanent damping of the proximity switches 43, 44.

It can also be seen in FIG., 1 that the bore hole 29 in which the signal rod 30 is borne, ends in the annular collar 38 so that the upper end 47 of the signal rod 30 can be brought into contact with the annular flange 40 of the signal ring 39. However, when the tool holder 18 has been moved out of the recess 17 the annular flange 40 rests on the collar 38 and is released by the signal rod 30. The annular flange 40 can, however, rest permanently on the signal rod 30 and thus help the spring 34 push the signal rod 30, and thus the key 33, downwards with the aid of the tension spring 41.

In this way the signal transmitter 31, consisting of the signal rod 30 and signal ring 29, comprises a sensor device 48 together with the recording device 42, which in the state shown in FIG. 1 indicates that the catch 32 is completely free.

The tool holder 18 is now inserted coaxially into the recess 17, either by moving the holder 26 upwards or the headstock 12 together with spindle 16 downwards. This position of the tool holder 18 is shown in FIG. 2.

The taper 19 is now completely inserted into the recess 17 and the key 33 has made contact with the annular face 23 of the tool holder 18. When the tool holder 18 is inserted into the recess 17 the signal rod 30 is hereby moved upwards against the force of the compression spring 34 and the tension spring 41 and its upper end 47 similarly pushes the annular flange 30 and thus the signal ring 39 upwards so that it is now on a level indicated by 49, above the elevations 45 and 46.

Figure 2:
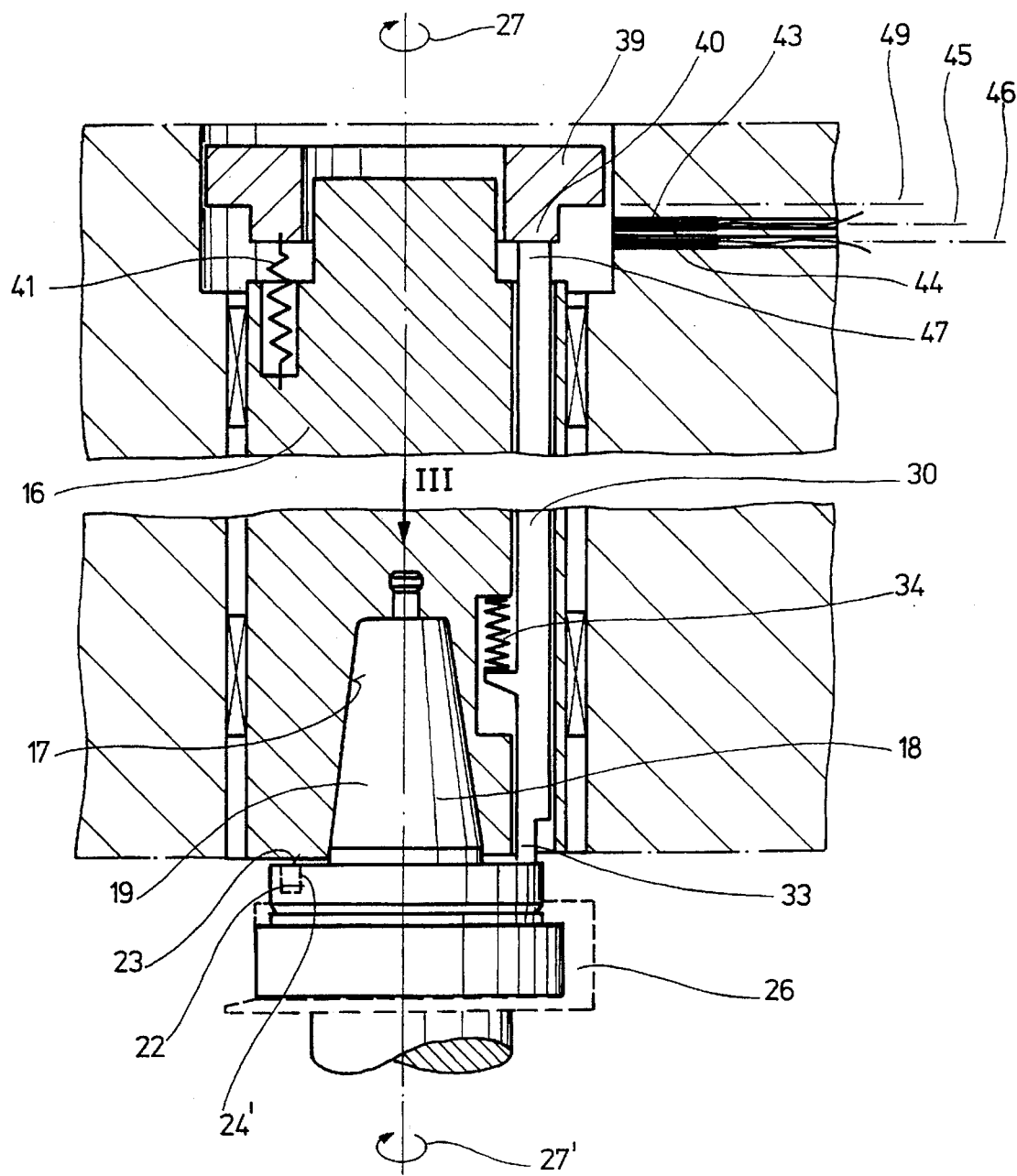
FIG. 2 a representation as in FIG. 1 whereby the tool holder is now in its couplable position.

On account of the relatively high coupling speed 27 of the spindle 16 the catch 32 cannot engage in one of the grooves 24, 24' when the tool holder 18 assumes the couplable position at the initially high relative speed between the stationary tool holder 18 and rotating spindle 16; this only becomes possible when the position shown in FIG. 2 is assumed, when the tool holder 18 has been accelerated by the "pulling effect" of the key 33. However, since the tool holder 18 is held in the gripper 26 by friction, the tool holder 18 cannot reach the coupling speed 27.

The inductive proximity switches 43, 44 are now opposite the annular flange 40 and are no longer damped by the signal ring 39. They thus signal to the aforementioned sequence controller that the tool holder 18 is in a couplable position. The tenon block 33 now slides over the face 23 and "searches for" one of the grooves 24, 24'.

When the tenon block 33 has penetrated the deeper of the two grooves 24, 24' the signal ring 39 once again assumes the position shown in FIG. 1 and ensures a permanent damping of the proximity switches 43, 44. The tool holder 18 is now locked with the spindle 16 so that it cannot rotate with respect to the latter.

Figure 3:
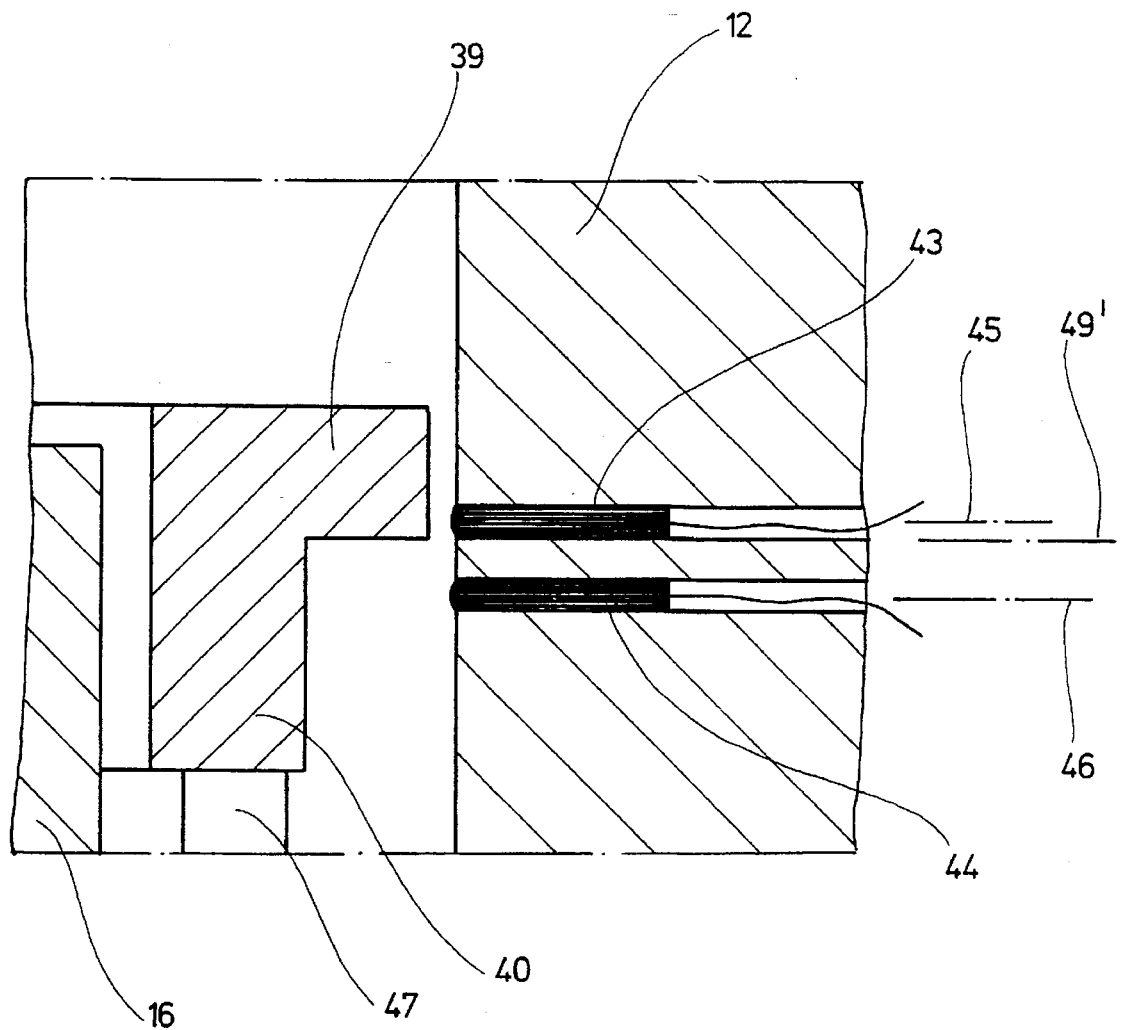
FIG. 3 an enlarged representation of the sensor device 48 from the machine tool as shown in FIG., 1, whereby the tool holder is in a second coupled state.

If the key 33 has penetrated the shallower of the grooves 24, 24' the signal ring 39 assumes the position shown in FIG. 3 in which it is on a level with 49', between levels, 45 and 46. The signal ring 39 now dampens only the upper proximity switch 43 whereas the lower proximity switch 44 is still undamped. These two pieces of information are transferred to the aforementioned sequence controller which recognises that the tool holder 18 has been rotated by 180° to its normal 0-position. This information is taken into account when the tool has to be advanced or retracted in the correct position.

Figure 4:
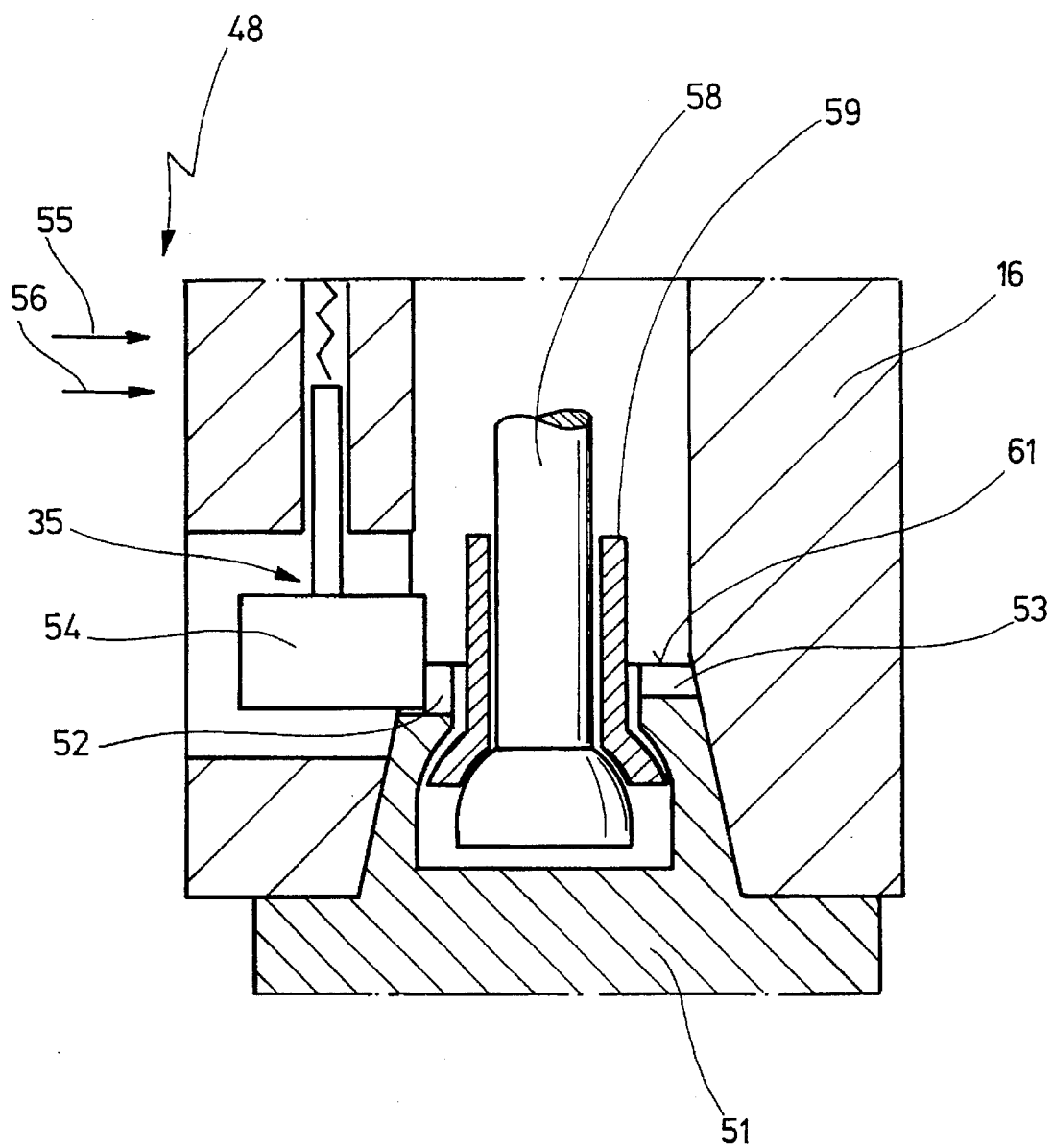
FIG. 4 a schematic diagram of a second machine tool with a hollow-shank tool holder, whereby the tool holder is in a coupled state.

FIG. 4 shows a section through a spindle 16 of an alternative embodiment for a machine tool 10 whereby a tool holder 51 with a hollow shaft in accordance with DIN 69893 is used. This tool holder 51 has catch grooves 52, 53 in the hollow shaft of the tool holder. These catch grooves 52, 53 are also of different depths so that a spring biased catch 54 can also engage at different depths. Two contactless absolute position transducers 55, 56 react to the different penetration depths of the catch 54 in the catch grooves 52, 53 and the results are the same as those with the proximity switches 43, 44 in FIGS. 1 to 3.

It should only be mentioned for reasons of completeness that 58 indicates a con-rod in FIG. 4 which pulls the tool holder 51 into the spindle 12 by means of a collet chuck indicated by 59. The tool holder taper is hereby larger than the taper in the spindle seat so that the redundancy is compensated by deformation of the tool holder taper.

FIG. 4 shows a first coupled condition, wherein catch 54 has penetrated into the deeper catch groove 52, whereas FIG. 5 shows a second coupled condition, wherein catch 54 has penetrated into shallower catch groove 53. The relationship between the transducers 55,56 and the shaft of catch 54 is comparable to that show in FIGS. 1 through 3 in connection with proximity switches 43, 44 and ring 39.

During the "search" and the acceleration due to the aforementioned "pulling effect" the catch 54 hereby slides over a face 61 which seals off the top end of the hollow shaft.

During precision work it may be important that the tool and the spindle assume a specified alignment to one another, so that this effect, which has been measured once, is reproduced by overlapping the eccentricity or out-of-true running of the spindle with the eccentricity or out-of-true running of the tool. Only then is it possible to take into consideration the resulting deviation from the nominal trajectory of the outer contour of the tool.

If this has to be taken into consideration during operation the sequence controller can eject the tool, rotate the spindle by 90° and replace the tool so that the "correct" orientation between the spindle and tool is reached; naturally, this too is checked and monitored.

Thus, the new sensor device can also be used to correct the orientation between spindle and tool with tool holders whose catches can engage in different grooves.

What we claim is:

1. A machine tool comprising:

a headstock having a rotatable spindle;

at least one gripper for gripping a tool holder and for transferring same from a first, uncoupled position outside said spindle into a second, ready-to-couple position within said spindle; coupling means arranged at said headstock for coupling said tool holder in said second, ready-to-couple position with said spindle, such that said tool holder assumes one of at least two coupled conditions, whereby in said at least two coupled conditions said tool holder is locked on said spindle for rotation therewith, said at least two coupled conditions being different from one another with respect to a relative angular alignment between said tool holder and spindle; and control means for controlling said spindle and having sensor means for detecting said tool holder to be in one of said coupled conditions and for differentiating between said at least two coupled conditions, wherein said coupling means comprises a catch on said spindle for displacement along said longitudinal axis relative to said spindle between at least three positions, said catch in each of said at least two coupled conditions of said tool holder engaging in a respective one of recesses provided on said tool holder, said catch engages in a different manner in the different recesses, to a different depth, and said sensor means arranged to detect said relative position of said catch with respect to said spindle.

2. The machine tool of claim 1, wherein said sensor means comprises at least one signal generating element rotating together with said spindle.

3. A machine tool comprising:

a headstock having a rotatable spindle;

at least one gripper for gripping a tool holder and for transferring same from a first, uncoupled position outside said spindle into a second, ready-to-couple position within said spindle;

coupling means arranged at said headstock for coupling said tool holder in said second, ready-to-couple position with said spindle, such that said tool holder assumes one of at least two coupled conditions, whereby in said at least two coupled conditions said tool holder is locked on said spindle for rotation therewith, said at least two coupled conditions being different from one another with respect to a relative angular alignment between said tool holder and spindle; and control means for controlling said spindle and having sensor means for detecting said tool holder to be in one of said coupled conditions and for differentiating between said at least two coupled conditions;

wherein said coupling means comprises a ring being arranged concentrically to said spindle and being journalled axially on said spindle, said ring coacting with said coupling means such that when said tool holder is in said second, ready-to-couple position said ring is in a first axial position and continuously coacts with at least two fixed transducer, when said tool holder is in a first coupled condition said ring is in a second axial position and continuously coacts with said transducers, and when said tool holder is in a second coupled condition said ring is in a third axial position and coacts with said transducers.

4. The machine tool of claim 3, wherein said signal generating element comprises a rod mounted on said spindle for longitudinal displacement thereon, said rod coacting with said catch, following the longitudinal movements thereof relative to said spindle, and with said ring.

5. A machine tool comprising:

a headstock having a rotatable spindle;

at least one gripper for gripping a tool holder and for transferring same from a first, uncoupled position outside said spindle into a second, ready-to-couple position within said spindle;

coupling means arranged at said headstock for coupling said tool holder in said second, ready-to-couple position with said spindle, such that said tool holder assumes one of at least two coupled conditions, whereby in said at least two coupled conditions said tool holder is locked on said spindle for rotation therewith, said at least two coupled conditions being different from one another with respect to a relative angular alignment between said tool holder and spindle; and control means for controlling said spindle and having sensor means for detecting said tool holder to be in one of said coupled conditions and for differentiating between said at least two coupled conditions;

wherein said coupling means comprises a catch on said spindle for displacement along a longitudinal direction relative to said spindle between at least three positions, said catch in each of said at least two coupled conditions of said tool holder engaging in a respective one of recesses provided on said tool holder, said catch engages in the different recesses to a different depth, and said sensor means are arranged to detect said relative position of said catch with respect to said spindle.

6. The machine tool of claim 5, wherein said sensor means comprises at least one signal generating element rotating together with said spindle.

7. The machine tool of claim 6, wherein said sensor means comprises a signal detecting element cooperating with said signal generating element and being fixed against rotation relatively to said headstock.

8. The machine tool of claim 7, wherein said signal detecting element responds to said signal generating element in any relative angular position between said spindle and said headstock.

9. The machine tool of claim 6, wherein said signal generating element comprises a rod mounted on said spindle for longitudinal displacement thereon, said rod coacting with said catch and following the longitudinal movements thereof relative to said spindle.

10. The machine tool of claim 5, wherein said sensor means comprises at least two signal generating elements cooperating with a signal detecting element for detecting the different engagement of the catch in the recesses.

11. The machine tool of claim 5, wherein said sensor means comprises a ring being arranged concentrically to said spindle and being journalled axially on said spindle, said ring coacting with said coupling means such that when said tool holder is in said second, ready-to-couple position said ring is in a first axial position and continuously coacts with at least two fixed transducers, when said tool holder is in a first coupled condition said ring is in a second axial position and continuously coacts with said transducer, and when said tool holder is in a second coupled condition said ring is in a third axial position and coacts with said transducers.

* * * * *